(12) United States Patent
Kumar et al.

(10) Patent No.: US 11,354,111 B2
(45) Date of Patent: Jun. 7, 2022

(54) HARDENING OF RULE DATA OBJECT VERSION FOR SMART DEPLOYMENT

(71) Applicant: PAYPAL, INC., San Jose, CA (US)

(72) Inventors: Sumit Kumar, Bangalore (IN); Prabin Patodia, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/009,562

(22) Filed: Sep. 1, 2020

(65) Prior Publication Data

US 2022/0066767 A1 Mar. 3, 2022

(51) Int. Cl.
*G06F 8/65* (2018.01)
*G06N 20/00* (2019.01)

(52) U.S. Cl.
CPC .............. *G06F 8/65* (2013.01); *G06N 20/00* (2019.01)

(58) Field of Classification Search
USPC ........................................................ 717/172
See application file for complete search history.

(56) References Cited

U.S. PATENT DOCUMENTS

| | | | | |
|---|---|---|---|---|
| 10,620,937 | B1* | 4/2020 | Brass | G06F 8/65 |
| 10,628,834 | B1* | 4/2020 | Agarwal | G06Q 30/0185 |
| 2004/0059802 | A1* | 3/2004 | Jacquemot | G06F 30/00 709/220 |
| 2008/0120129 | A1* | 5/2008 | Seubert | G06Q 10/10 705/35 |
| 2017/0289115 | A1* | 10/2017 | Lessiak | H04W 12/35 |
| 2020/0394263 | A1* | 12/2020 | Ganu | G06N 20/00 |
| 2021/0056637 | A1* | 2/2021 | Downs | G16H 70/20 |
| 2021/0065191 | A1* | 3/2021 | De Shetler | G06Q 20/203 |
| 2021/0133605 | A1* | 5/2021 | Greene | G06N 20/00 |

OTHER PUBLICATIONS

J. Dietrich et al.; "Dependency Versioning in the Wild"; 2019 IEEE/ACM 16th International Conference on Mining Software Repositories (pp. 349-359); 2019 (Year: 2019).*
J. Gergic; "Towards a Versioning Model for Component-Based Software Assembly"; Proceedings of the International Conference on Software Maintenance (pp. 138-147); ICSM 2003 (Year: 2003).*

\* cited by examiner

*Primary Examiner* — Wei Y Zhen
*Assistant Examiner* — Clint Thatcher
(74) *Attorney, Agent, or Firm* — Haynes and Boone, LLP (57) ABSTRACT

There are provided systems and methods for hardening of rule data object version for smart deployment. A service provider, such as an electronic transaction processor for digital transactions, may utilize different decision services that implement rules for decision-making of data including real-time data in production computing environments. Rules may correspond to coded statements that perform an automated decision-making service for the computing services and platforms of the service provider. When writing rules different variables for data objects are used, which are updated over time. Thus, a rule authoring application may be updated over time to have more and newer variables, which requires updating of the decision services. To optimize updating of the decision services when deploying new rules, the service provider may determine compatible versions of specifications for the variables. Thereafter, the service provider may determine whether a device service's variable specification requires updating.

20 Claims, 6 Drawing Sheets

HARDENING OF RULE DATA OBJECT VERSION FOR SMART DEPLOYMENT

TECHNICAL FIELD

The present application generally relates to optimizing updates to decision services to remove unnecessary updating and providing smart deployment of updates and more particularly to determining required versions of rule data object specifications for rule data packages.

BACKGROUND

Users may utilize computing devices to access online domains and platforms to perform various computing operations and view available data. Generally, these operations are provided by different service providers, which may provide services for account establishment and access, messaging and communications, electronic transaction processing, and other types of available services. During use of these computing services, the processing platforms and services, the service provider may utilize one or more decision services that implement and utilize rules for decision-making in real-time data processing, such as within a production computing environment. For example, a data processing rule may correspond to an expression or argument written in computing code and executable processes that allow for processing data and determining a decision that may be used for different operations and processes of the service provider. These rules may be written in a specific vocabulary and grammar for data objects within the rule, which designates the data to be entered to rule for processing. However, this vocabulary and grammar may be updated over time, which requires distribution to the decision services and updating of the decision services. Distribution and updating though is time consuming and requires processing resources, which may also include downtime for the decision services that affects the computing architecture of the service provider.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for hardening of rule data object version for smart deployment. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent decision-making operations with such services. For example, an online transaction processor may provide services associated with electronic transaction processing, including account services, user authentication and verification, digital payments, risk analysis and compliance, and the like. These services may further implement automated and intelligent decision-making operations and engines, including data processing rule engines that automate certain decision-making based on rules designated for the systems. These decision services may be used for risk analysis, fraud detection, and the like to determine if, when, and how a particular service may be provided to users. For example, risk rules may be utilized with a risk engine for a decision service to determine if an indication of fraud is present in a digital transaction and payment, and therefore to determine whether to proceed with processing the transaction or decline the transaction (as well as additional operations, such as request further authentication and/or information for better risk analysis).

These decision services may include rules written in a rule vocabulary. When writing rules, a rule authoring application may be utilized by a rule author in order to designate variables for data objects that correspond to data to be processed within a rule. A variable may correspond to a piece or portion of data for processing, which may correspond to a data object that obtains specific data from a certain resource. For example, a variable and/or a data object may correspond to account information, where the available data objects that request, determine, or retrieve for account information may include an account number, username, user information, user/account identifier, and the like. These variables may be written and defined for a rule data object (RDO) specification, which includes the available variables and data objects that may be used in the rule authoring application for writing rules that are combined into rule data packages and deployed to the decision services. Thus, a rule package may correspond to a data file or folder having the correspond rule files, operations, and/or processes, such as a .zip file or the like that packages the corresponding rules into an executable file or folder.

However, over time, a RDO specification having the variables for data objects that is used for the vocabulary to write rules may be updated. For example, new variables and/or data objects may be implemented, such as a new variable for a different piece or portion of account information, user information, transaction information, or the like, as well as new data objects for new or existing variables (e.g., for account information, a data object to obtain the corresponding name data from a different resource). Thus, over time the RDO specification version is updated, which is automatically provided to and implemented with the rule authoring application so that rules may be written with the available variables. Thus, the rule authoring application may have the newest or most current (e.g., highest) RDO specification. The version of the RDO specification is also required to be updated with decision services that utilize rules having the variables in this version of the RDO specification. For example, a rule writer may use one or more variables in the newest version of the RDO specification, which also requires the decision service to have this version of the RDO specification to be able to implement and execute the corresponding rules.

However, decision services may not require the newest version of the RDO specification. For example, a rule writer may utilize variables that are found in one or more older versions of the RDO specification and may not utilize more recent versions of the RDO specification and therefore newer variables in rule writing. When this occurs, a data package for one or more rules to be deployed to one or more decision services may utilize variables that are found in an older version of the RDO specification than the most recent RDO specification currently in use by the rule authoring application. Thus, certain decision services may not require updating in all instance of deployment of a new rule package to one or more of the decision services. Additionally, updating of the decision services may unnecessarily cause decision services to be taken offline or otherwise operated on to perform the update, which also utilizes unnecessary computing resources and time. Thus, different decision services may utilize different rule packages having different minimum required versions of the RDO specification, and therefore, optimization of updating and upgrading decision services may be performed by intelligently deploying the rule packages and updating the RDO specification versions for decision services when required (and not performing unnecessary updates of decision service's RDO specifications).

To address this problem, the service provider may utilize a rule release application with an intelligent compute processor and smart deployer to determine a "hardened" rule data package that designates the minimum required version (e.g., oldest or lowest required version) of an RDO specification required by a rule data package (also referred to as a "ruleapp" herein). A rule data package may correspond to one or more rules for decision-making by one or more decision services that is authored in the rule authoring application having the newest version of the RDO specification. However, since certain rules may not utilize the newest variables, hardening of the rule package may show compatibility of the rule package with different RDO specifications. For example, hardening of a rule package may correspond to cleanup of unused variables and data objects from the metadata in the rule package, and thereafter packaging or storing of the compatible RDO specification version(s) inside or with the rule package. In order to perform hardening of rule packages for smart deployment and optimized updating of decision services, the service provider may utilize the rule release application with the intelligent compute processor to determine which variables and/or data objects are used by the rule package, as well as unused variables, in order to determine the minimum required version of the RDO specification for the rule package.

For example, the intelligent compute processor may receive a rule data package for release and deployment to one or more decision services, where the rule package includes one or more rules having one or more variables for data objects that are used to retrieve data from a resource (e.g., database, input by a user, other data processing operation, etc.) that is processed by the decision service using the rule/rule package. The intelligent compute processor may determine the used variables and data objects within the rule, which may then be compared to the versions of the RDO specification to find used variables from the RDO specification. Once the used variables are determined, the unused variables are determined, which may be used to find an oldest or minimum required version of the RDO specification for the rule package. Thereafter, this minimum version may correspond to the compatible versions of the RDO specification (e.g., the minimum required version and the more recent versions having the necessary variables and data objects of the RDO specification).

To perform this determination, in certain embodiments, a variable tree may be generated based on the RDO specification versions, as well as the rule(s) within the rule package. For example, a variable tree that shows the variables implemented and used by the different versions of the RDO specification may be determined by mapping each variable and data object in a version of the RDO specification, including corresponding data for rule entry and resource for the data, into a branch and sub-branches of the tree. Thereafter, for an RDO specification, when a version update occurs, a new branch showing the delta or change includes the new variables and data objects, as well as any changes to data object parameters (e.g., resource for data entry to the rule). This allows for viewing of the variable updates in each consecutive version of the RDO specification. In other embodiments, in absence of a tree approach, other connective approaches may be utilized. For example, different layer of a neural network may connect different values. Those values may identify such variables and therefore provide different interconnectivity between related variables.

For example, with a variable for account information having data objects for account first name and account number within a version 0 (e.g., release version), a first branch may show the v.0 version, account, and account first name and account number. Thereafter, in a version 1 (first update), a variable for transaction information and transaction amount data object may be added. Thus, a second branch may show v.1, transaction, and transaction amount. This may be performed each time an RDO specification is first established and published to the rule authoring application, as well as when the RDO specification is updated and released to the rule authoring application. Additionally, determination of the RDO specification's variable tree may also be performed when analyzing and hardening rule packages. Once determined, the variable tree for the versions of the RDO specification may be stored to an RDO tree repository for usage when hardening rule packages.

Thereafter, a variable tree for each rule in the rule package is determined. For example, with a rule package having a single rule, a variable tree may be done by mapping the variables and data objects used within the rule to branches of a variable tree for the corresponding rule. This may show all variables and data objects used within a rule and/or rule package. For example, a rule using a variable for account information and account first name may be used. The rule variable tree may then include a variable for account and account first name. Thereafter, this rule variable tree is compared to the RDO specification variable tree having the variables in the different versions mapped to the tree's branches. However, other relations may also be utilized, such as those between related layer in a machine learning or neural network process.

The intelligent compute processor may identify all used variables and data objects for the rule. Thereafter, all unused variables and data objects are removed from the compared RDO specification variable tree to the rule variable tree to show the minimum required version of the RDO specification for the rule package. In the previous exemplary rule variable tree, the comparison may show that the minimum required version of the RDO specification for the rule package having the exemplary rule is v.0. Thus, the rule package is compatible with v.0 and v.1. Once this minimum required version and/or compatible versions is/are determined, a hardened rule package is generated by having the compatible version(s) stored, packaged, or otherwise correlated to rule package.

The hardened rule data package is then provided to the rule release application and/or stored in a rule package or ruleapp repository. When the hardened rule package is deployed to a decision service, a smart deployer may be implemented to determine whether to update the decision service's RDO specification version and upgrade to a newer version. For example, a smart deployer may be used when the hardened rule package is sent to the decision service for implementation and use with the decision service. The smart deployer may compare the compatible versions of the RDO specification for the hardened rule app to the currently in-use version of the RDO specification used by the decision service with the rule packages of the decision service. If the decision service has the same or more recent RDO specification version (e.g., a compatible version of the RDO specification with the hardened rule package), then there is no need to update the decision service and/or upgrade the version of the RDO specification version with the decision service. The hardened rule package may be deployed with the decision service without requiring an update and the rule package may be used by the decision service for intelligent decision-making. Thus, the service provider is not required to continually update decision services to have a highest or newest RDO specification.

However, if the decision service uses an older version of the RDO specification than is compatible with the hardened rule package, the smart deployer may determine that the currently in-use version of the RDO specification requires an update with the decision service and upgrade to a newer version. The smart deployer may utilize a compatible version of the RDO specification with the hardened rule package, such as the newest/highest version of the RDO specification or at least a more recent version of the RDO specification that is compatible with the hardened rule package. Thereafter, the smart deployer may perform updating of the decision service's RDO specification to the compatible version. Upgrading of the decision service may be performed automatically without user request and/or interaction such that a system administrator or developer is not required to perform the updating directly and/or take the decision service offline for update. For example, updating and deployment of the compatible version of the RDO specification may be performed as a hot deployment of the RDO specification version to the decision service instead of a scheduled maintenance and/or analysis of the decision service.

Thereafter, a service provider, such as an online transaction processor may provide services to users, including electronic transaction processing, such as online transaction processors (e.g., PayPal®) that allows merchants, users, and other entities to processes transactions, provide payments, and/or transfer funds between these users. When interacting with the service provider, the user may process a particular transaction and transactional data to provide a payment to another user or a third-party for items or services. Moreover, the user may view other digital accounts and/or digital wallet information, including a transaction history and other payment information associated with the user's payment instruments and/or digital wallet. The user may also interact with the service provider to establish an account and other information for the user. In further embodiments, other service providers may also provide computing services, including social networking, microblogging, media sharing, messaging, business and consumer platforms, etc. These computing services may be deployed across multiple different applications including different applications for different operating systems and/or device types. Furthermore, these services may utilize the aforementioned decision services having the rule packages based on versions of the RDO specification.

In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. Access and use of these accounts may be performed in conjunction with uses of the aforementioned decision services.

Figure 1:
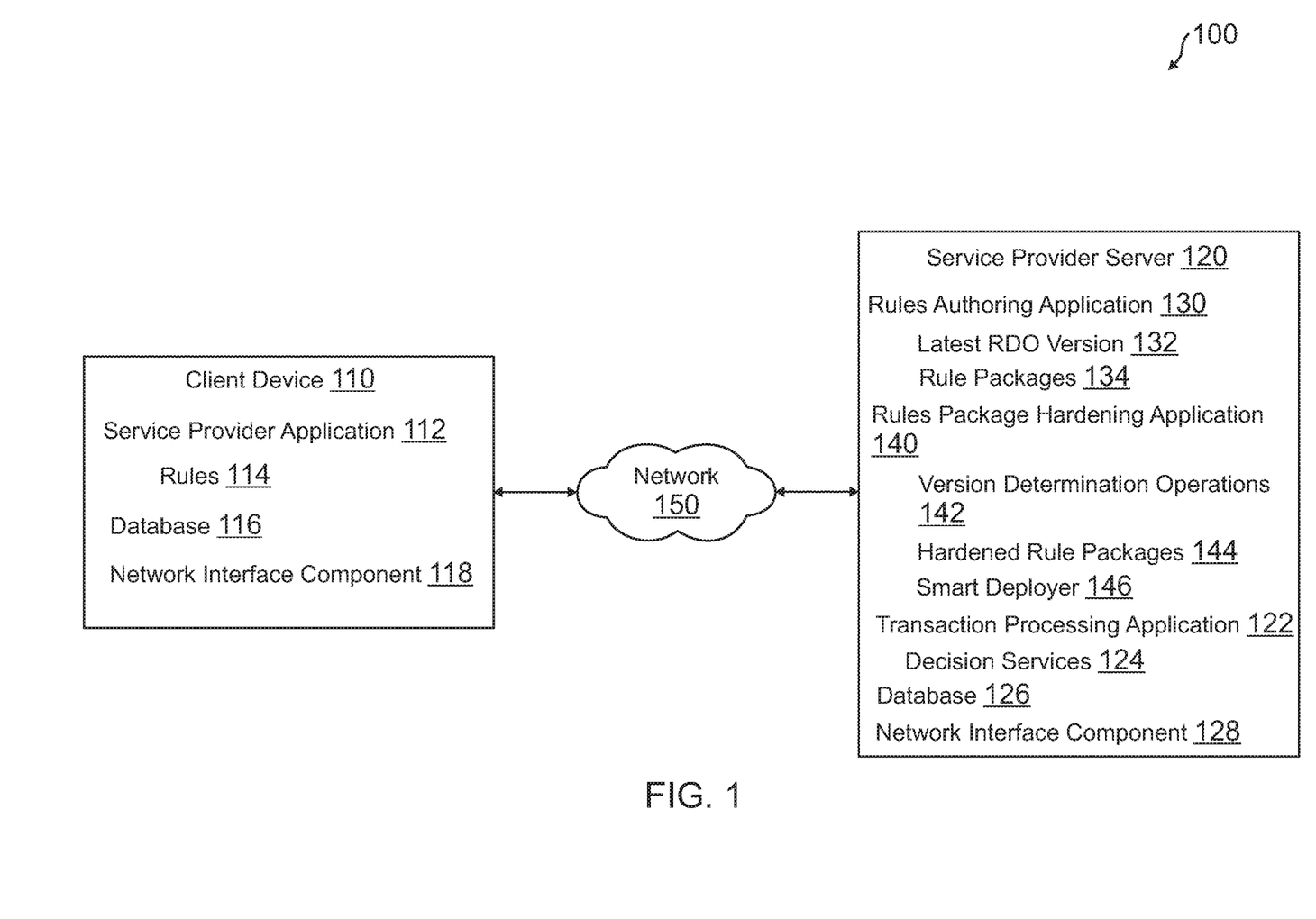
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 150. Client device 110 may be utilized by a user to access a computing service or resource provided by service provider server 120, where service provider server 120 may provide various data, operations, and other functions to client device 110 via network 150 including those associated with rule authoring and deployment of rules for use in decision services. In this regard, client device 110 may author one or more rules for a rule data package, which may then be deployed by service provider server 120. In order to optimize deployment of rule data packages, service provider server 120 may perform hardening of a required RDO specification version for the rule data package in order to perform smart deployment with decision services.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains a service provider application 112, a database 116, and a network interface component 118. Service provider application 112 may correspond to executable processes, procedures, and/or applications with associated hardware. In other embodiments, client device 110 may include additional or different modules having specialized hardware and/or software as required.

Service provider application 112 may correspond to one or more processes to execute software modules and associated components of client device 110 to provide features, services, and other operations for writing and constructing rules for service provider server 120 using variables for one or more versions of an RDO specification used by service provider server 120. In this regard, service provider application 112 may correspond to specialized hardware and/or software utilized by a user of client device 110 that may be used to access a website or UI provided by service provider server 120. Service provider application 112 may utilize one or more UIs, such as graphical user interfaces presented using an output display device of client device 110, to enable the user associated with client device 110 to enter and/or view data, navigate between different data, UIs, and executable processes, and request processing operations based on services for rule authoring provided by service provider server 120. In some embodiments, the UIs may display variables for a vocabulary of one or more versions of a rule construction specification, such as different versions of an RDO specification. In order to do this, service provider application 112 may render a UI during application execution, which may correspond to a webpage, domain, service, and/or platform provided by service provider server 120 for rule authoring using the variables of the version of the RDO specification.

In some embodiments, rules 114 constructed using service provider application 112 may include rules for decision-making used in electronic transaction processing provided by service provider server 120. However, in further embodiments, different services may be provided that utilize rules 114 constructed using service provider application 112, including messaging, social networking, media posting or sharing, microblogging, data browsing and searching, online shopping, and other services available through online service providers. Thus, service provider application 112 may display one or more operations for rule construction, which may utilize variables provided in service provider application 112. When constructing rules 114, service provider application 112 may allow for selection and/or use of the variables, which may be added to the RDO over time in different versions of the RDO specification. Thus, a constructed rule may utilize one or more different versions of the RDO specification, which may go back to the original version or some later version after updating with additional variables. One or more of rules 114 may be packaged into a rule package, which requires one or more versions of the RDO specification in order to be read and processed by a decision service that implements and executes the rule. Thus, service provider server 120 may perform rule package hardening in order to determine compatible versions of the RDO specification, including an oldest or minimum required version of the RDO specification required for reading the rule and processing data using the rule.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with service provider application 112 and/or other applications 114, identifiers associated with hardware of client device 110, or other appropriate identifiers, such as identifiers used for payment/user/device authentication or identification, which may be communicated as identifying the user/client device 110 to service provider server 120. Moreover, database 116 may include information for writing and constructing rules 114, such as variables for a version of an RDO specification, as well as RDO specification variable trees and rule variable trees. Further, one or more compatible versions of the RDO specification may be displayed with a hardened rule package.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide services that use data processing rules with decision services to perform automated decision-making in an intelligent system. In this regard, service provider server 120 includes one or more processing applications which may be configured to interact with client device 110 to generate and deploy rules in hardened rule data packages that show the compatible version(s) of an RDO specification for rule data packages. In one example, service provider server 120 may be provided by PAYPAL®, Inc. of San Jose, Calif., USA.

However, in other embodiments, service provider server 120 may be maintained by or include another type of service provider.

Service provider server 120 of FIG. 1 includes a rule authoring application 130, a rule package hardening application 140, a transaction processing application 122, a database 126, and a network interface component 128. Rule authoring application 130, rule package hardening application 140, and transaction processing application 122 may correspond to executable processes, procedures, and/or applications with associated hardware. In other embodiments, service provider server 120 may include additional or different modules having specialized hardware and/or software as required.

Rule authoring application 130 may correspond to one or more processes to execute modules and associated specialized hardware of service provider server 120 to provide a platform and framework to generate rules used in decision services used by one or more applications, services, and/or platforms of service provider server 120. In this regard, rule authoring application 130 may correspond to specialized hardware and/or software used by service provider server 120 to implement a latest RDO version 132 of an RDO specification having variables used for construction of rules in rule packages 134, which may then be hardened into hardened rule packages. Hardening of rule packages 134 may therefore include the compatible version(s) of the RDO specification, which may include latest RDO version 132 as well as one or more previous RDO specification versions. In this regard, rule authoring application 130 may access latest RDO version 132 for the RDO specification having variables that correspond to different operations or processes to load data from one or more resources into a rule or coded expression, such as rules 114 constructed by client device 110. Rules 114 may be used for decision-making in one or more other applications, such as transaction processing application 122 having decision services 124 used for automated decision-making using rules 114.

Using the variables within latest RDO version 132, rule authoring application 130 may be used to select variables used to author, write, and construct a rule that may be implemented in one or more of rule packages 134. For example, a first variable of latest RDO version 132 may correspond to a specific data object to load data to a rule, such as a first name for an account holder. This may be done from a database resource, cache, user input, or processing operation. Thus, latest RDO version 132 includes the vocabulary to author and construct rules using variables, where each variable may have a corresponding version that was used to implement the variable in the RDO specification. Each rule may be generated using one or more variables for data retrieval, loading, and processing in the rule, as well as the processing operations for the variables. Once a rule is authored, it may be implemented in and deployed to one or more of decision services 124 of transaction processing application 122 using one or more of rule packages 134. However, prior to deployment, rule package hardening application 140 may be used to determine compatible version(s) of the RDO specification for rule packages 134. Thereafter, rule package hardening application 140 may utilize hardened rule packages 144 with smart deployer 146 in order to determine whether the RDO specification's version(s) used by each of decision services 124 is/are required to be updated and upgraded to a newer or later version.

Rule authoring application 130 may correspond to one or more processes to execute modules and associated specialized hardware of service provider server 120 to provide a platform and framework to harden rule packages 134 into hardened rule packages 134 that includes the compatible versions of the RDO specification packaged with the rules for use with deployment and updating of decision services 124. In this regard, rule authoring application 130 may correspond to specialized hardware and/or software used by service provider server 120 to first receive and access rule packages 134 having one or more rules written and constructed using variables from one or more versions of an RDO specification. Version determination operations 142 of rule authoring application 130 may be used to determine compatible versions of the RDO specification for rule packages 134 based on variables used by each rule in rule packages 134. This may include identifying all used variables by the rule, and then unused variables of the RDO specification, to determine an oldest or minimum required version of the RDO specification for a rule and corresponding rule package. Furthermore, variable trees may be used for the comparison and determination of used and unused variables of the RDO specification, which may allow for determination of the compatible version(s) of the RDO specification. For example, the variable trees for an RDO specification and a rule are shown with regard to FIGS. 3A and 3B. Once the compatible version(s) are determined, information for the compatible version(s) is then packaged with the corresponding on of rule packages 134 to generate hardened rule packages 144.

Thereafter, smart deployer 146 may be used to deploy hardened rule packages 144, while updating any of decision services 124 based on the compatible versions of the RDO specification for hardened rule packages 144. For example, when deploying hardened rule packages by a rule release application or process, smart deployer 144 may compare the compatible versions of hardened rule packages 144 to the currently in-use version of the RDO specification for targeted decision services 124 for deployment of hardened rule packages 144. For example, with one of hardened rule packages 144, a minimum required version or oldest version of the RDO specification may be determined by version determination operations 142 and packages in the corresponding hardened rule package. Thereafter, one of decision services 124 targeted for deployment of the corresponding hardened rule package may have an in-use version of the RDO specification currently being used for rule reading and execution. If the in-use version is compatible with the corresponding hardened rule package (e.g., if the version meets or exceeds the minimum required version), no updating of the targeted decision service may be required. However, if not, smart deployer may perform an automated hot deployment and updating of the version of the RDO specification for the decision service, which may update the RDO specification version to the latest version or at least one of the compatible version.

Transaction processing application 122 may correspond to one or more processes to execute modules and associated specialized hardware of service provider server 120 to process a transaction, which may be assisted by rule authoring application 130 in generating rules used by decision services 124 to decision-making during the services of transaction processing application 122. In this regard, transaction processing application 122 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account. However, in other embodiments, transaction processing application 122 may instead be utilized for other service and computing processes provided by service provider server 120.

The payment account may be accessed and/or used through a browser application and/or dedicated payment application executed by client device 110 and engage in transaction processing through transaction processing application 122, such as service provider application 112 that displays UIs from service provider server 120. Transaction processing application 122 may process the payment and may provide a transaction history to client device 110 for transaction authorization, approval, or denial. Such account services, account setup, authentication, electronic transaction processing, and other services of transaction processing application 122 may utilize decision services 124, such as for risk analysis, fraud detection, and the like. Thus, decision services 124 may implement rules written by and deployed from rule authoring application 130, for example, based on interactions and rule construction requests performed by client device 110. These rules may be deployed using hardened rule packages 144, which may include the compatible versions of an RDO specification for each of rule packages 134. Thus, hardened rule packages 144 may be used to determine whether decision services 124 are required to be updated using smart deployer 146 when hardened rule packages 144 are deployed to decision services 134.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store financial information and tokenization data. Database 126 may further store data necessary for rule authoring application 130, including RBO/RDO specification 132 having variables.

In various embodiments, service provider server 120 includes at least one network interface component 128 adapted to communicate client device 110 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
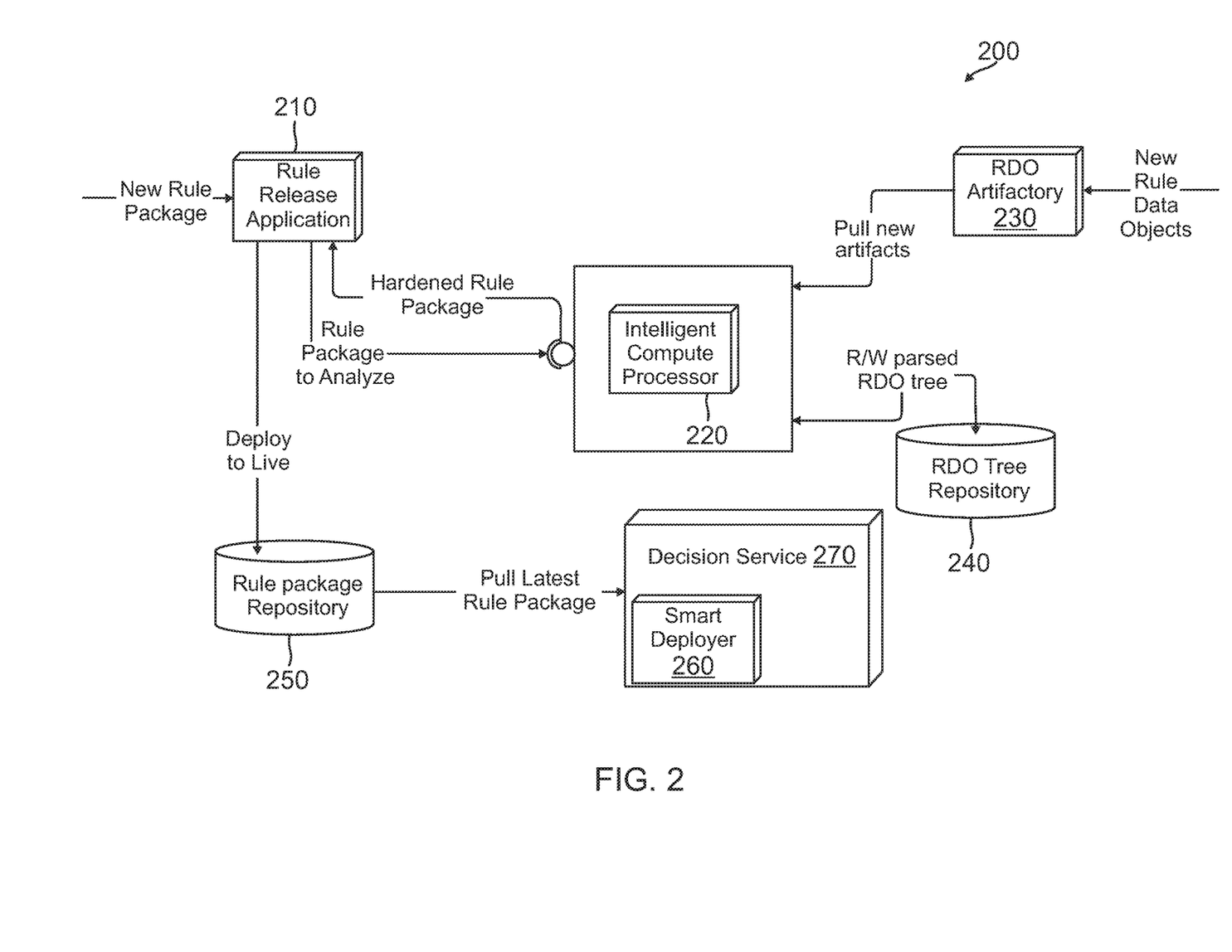
FIG. 2 is an exemplary system environment where rule data packages are analyzed for smart deployment of rule data packages and updates to decision services, according to an embodiment.

FIG. 2 is an exemplary system environment 200 where rule data packages are analyzed for smart deployment of rule data packages and updates to decision services, according to an embodiment. System environment 200 of FIG. 2 includes applications and systems utilized by a service provider, such as service provider server 120 discussed in reference to system 100 of FIG. 1, which may be executed when providing rule authoring and release of services for rules implemented in one or more decision services, such as decision services 124. In this regard, a rule release application 210 may receive a rule package having one or more rules for release and deployment with the decision services, such as after authoring a rule and/or rule package by rule authoring application 130, as discussed with respect to system 100.

System environment 200 shows how rule authoring application 130 may provide a new data package having one or more packaged rules, or ruleapp, to rule release application 210. Rule release application 210 may then harden the rule package for release and deployment, which may package the compatible version(s) of a corresponding RDO specification with the rule package for deployment. In this regard, new rule packages are received by rule release application 210, which may then provide the rule packages to intelligent compute processor 220. Intelligent compute processor 220 may correspond to one or more services and operations to determine the variables used by the rule(s) in a rule package, and thereafter compare those to the RDO specification to determine unused variables of the RDO specification. This allows for determination of a minimum required or oldest version of the RDO specification that is compatible with the rule(s) in the rule package, and therefore the compatible versions of the RDO specification for the rule package.

Figure 3A:
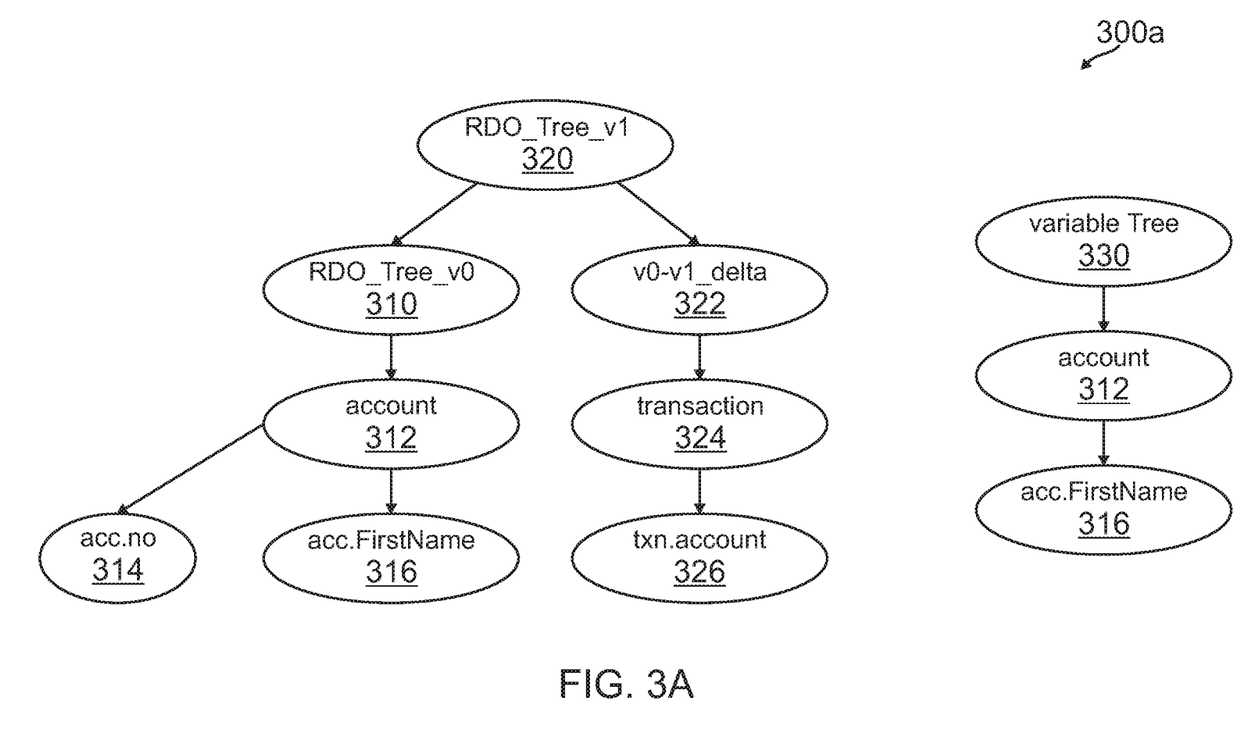
FIG. 3A is an exemplary diagram of variable trees for data objects in a version of rule data object specification and a rule, according to an embodiment.
Figure 3B:
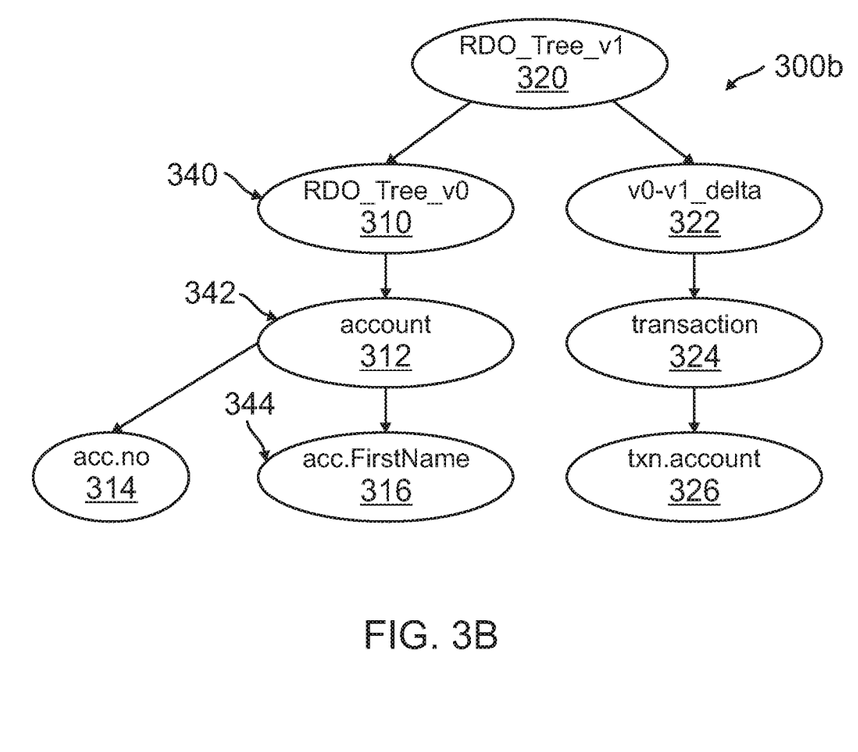
FIG. 3B is an exemplary diagram of a variable tree for data objects in a version of rule data object specification matched to a rule, according to an embodiment.

For example, these compatible versions may include the minimum required version of the RDO specification, as well as any newer versions of the RDO specification. In this regard, the compatible versions of the RDO specification may include all versions of the RDO specification that include all of the variables used in the rule(s) within the rule package. A rule may utilize one or more variables from the RDO specification for rule authoring and execution in one or more decision services. In order to determine the used variables in a rule and/or unused variables from an RDO specification, variable trees may be generated and/or accessed for both the rule and the RDO specification, which may be compared to determine the used/unused variables and therefore compatible versions of the RDO specification for a rule package. Generation and comparison of variable trees are shown in FIGS. 3A and 3B. Generation of a variable tree for a rule in a rule package may be performed using the rule package received by intelligent compute processor 220 from rule release application 210.

An RDO artifactory 230 may provide new rule data objects or variables to intelligent compute processor 220 for determination of the RDO specification's variable tree. In this regard, RDO artifactory 230 may correspond to a database, repository, or other data acquisition state that may provide different variables available for authoring one or more rules, including local databases, caches, and the like. RDO artifactory 230 may provide an RDO specification and corresponding variables on release of the RDO specification (e.g., at an initial version or version 0, v.0), and may also provide further releases of version for the RDO specification. These further releases may correspond to a new or latest version of the RDO specification that includes newly released variables, as well as the prior released variables for rule authoring. Once intelligent compute processor 220 receives the RDO specification's version and corresponding variables from RDO artifactory 230, intelligent compute processor 220 may generate and/or update the variable tree for the RDO specification. For example, with an initial version, tree branches may be made for the variables and corresponding data objects. However other relationships may also be used, such as linking object based on elements or parts that may be interrelated. Each updating may therefore create a new branch showing a delta in changes between versions, as well as any new branches for newly added variables and data objects. The variable tree(s) for the RDO specification(s) may be stored to RDO tree repository 240, which may then be accessed and used for rule package hardening when receiving a rule package from rule release application 210.

The latest version of the RDO specification may be immediately released to rule authoring application 130. However, decision services 124 may instead be required to be updated, which may consume resources, take time, and/or otherwise affect the operations of decision services 124. Therefore, intelligent compute processor 220 generates the hardened rule package using the aforementioned variable trees. An exemplary comparison of variable trees for rule package hardening is shown in FIG. 3B. After generating a hardened rule package by intelligent compute processor 220, intelligent compute processor 220 provides the hardened rule package to rule release application 210, which is then stored by a rule package repository 250 for deployment to a decision service 270.

When deployment of the hardened rule package occurs, smart deployer 260 associated with decision service 270 may pull the hardened rule package from rule package repository 250. Smart deployer 260 may correspond to an application and/or operation to intelligently deploy hardened rule packages based on the compatible versions of the hardened rule package, as well as perform automated updating of one or more decision services based on the compatible versions. For example, decision service 270 may currently run or utilize an in-use version of the RDO specification, which corresponds to one of the compatible versions of the RDO specification for the hardened rule package. In such embodiments, smart deployer may deploy the hardened rule package to decision service 270 for use in automated decision-making based on the written rules. However, if decision service 270 uses an older or incompatible version of the RDO specification, and the hardened rule package uses variables not found in that in-use version by decision service 270, smart deployer 260 may determine that decision service 270 requires an update of its RDO specification. Smart deployer 270 may execute a hot deployment of the latest RDO version, or at least one of the compatible versions, to decision service 270, which may be performed automatically to update decision service 270.

FIG. 3A is an exemplary diagram 300a of variable trees for data objects in a version of rule data object specification and a rule, according to an embodiment. Diagram 300a includes a first RDO variable tree 310, a second RDO variable tree 320, and a rule variable tree 330 determined by a service provider for use in performing rule package hardening with compatible RDO specification versions, such as when using service provider server 120 in system 100 of FIG. 1 for rule authoring and deployment. In this regard, first RDO variable tree 310, second RDO variable tree 320, and rule variable tree 330 may be compared to generate the compared variable tree of FIG. 3B for use in hardening rule packages with compatible versions of the RDO specification.

A variable tree for an RDO specification is shown to the left of diagram 300a, where the RDO specification has two versions, a v0 or version 0 (e.g., initial release version) of the RDO specification shown in first RDO variable tree 310, as well as a v1 or version 1 (e.g., latest version or currently released version) of the RDO specification shown in second RDO variable tree 320. First RDO variable tree 310 includes variables and corresponding data objects to load data to a rule for rule execution, and decision-making (e.g., data processing). For example, in v0, a variable for an account 312 is shown with loadable data for an account no. 314 and an account first name 316. Thus, when using the variable for account 312 in v0, rules may be authored to load data for account no. 314 and account first name 316. Thus, first RDO variable tree 310 for v0 of the RDO specification shows the variable for account 312 having account no. 314 and account first name 316 in branches under first RDO variable tree 310. In further embodiments, additional variables may also exist in v0 of the RDO specification.

Later, the RDO specification may be updated to include additional variables used in rule authoring and data processing. For example, in a release of v1 of the RDO specification, variables for a transaction 324 having a transaction amount 326 may correspond to newly added data objects for rule authoring to load data to a rule for rule execution and decision-making. Thus, when authoring rules in v1 of the RDO specification using the variable for transaction 324, rules may further be authored to load data for transaction amount 324. This causes a branch of second RDO variable tree 320 to include a branch showing a delta 322 from v0-v1, or a change between v0 to v1 that includes transaction 324 having transaction amount 326. Further, v1 includes the variables released in v0 of the RDO specification, namely, account 312 having account no. 314 and account first name 316. Thus, as shown in second RDO variable tree 320, first RDO variable tree 310 is a portion of second RDO variable tree 320, where the variables from v0 of the RDO specification are included within v1. This causes second RDO variable tree 320 to include first RDO variable tree 310 as a corresponding branch within second RDO variable tree 320.

Rule variable tree 330 for a rule is further shown to the right in diagram 300a. In this regard, rule variable tree 330 for the rule is constructed by determining the variables and corresponding data objects that are used by the rule for data loading during rule execution. A simplified rule and corresponding rule variable tree 330 is shown in diagram 300a as having one variable but it is understood that other rules may include a plurality of variables. In rule variable tree 330, the variable for account 312 is used having account first name 316 as the data to be loaded to the rule corresponding to rule variable tree 330. Thus, rule variable tree 330 includes one branch for the variable corresponding to account 312 having account first name 316 as the loadable data. Thereafter, the rule is compared to the latest version of the RDO specification by comparing rule variable tree 330 to second RDO variable tree 320, as shown in FIG. 3B.

FIG. 3B is an exemplary diagram 300b of a variable tree for data objects in a version of rule data object specification matched to a rule, according to an embodiment. Diagram 300b includes a compared variable tree 340 determined by a service provider for use in performing rule package hardening with compatible RDO specification versions, such as when using service provider server 120 in system 100 of FIG. 1 for rule authoring and deployment. In this regard, compared variable tree 340 may be generated using first RDO variable tree 310, second RDO variable tree 320, and rule variable tree 330 of FIG. 3A for use in hardening rule packages with compatible versions of the RDO specification.

In diagram 300b, compared variable tree 340 may show the comparison between rule variable tree 330 and second RDO variable tree 320, which allows for identification and removal of unused variables from second RDO variable tree 320. This then allows for visualization and determination of a minimum required or oldest version of the RDO specification that may be used for reading and executing the rule corresponding to rule variable tree 330. For example, in second RDO variable tree 320, variable tree 330 uses the variable corresponding to account 312 for loading of data for account first name 316 to the rule for rule authoring and execution. Thus, as shown in diagram 300b, account 312 and account first name 316 are used from first RDO variable tree 310 and second RDO variable tree 320. Thus, a variable tree usage 340 is shown as use of first RDO variable tree by the variable for an account usage 342 and account first name usage 344 is the corresponding rule. This is shown through the shading of first RDO variable tree 310, account 312, and account first name 314. However, no variables from second RDO variable tree 320 are used.

Thus, when viewing diagram 300b, it is then seen that the minimum required or oldest version of the RDO specification is v0 corresponding to the highlighting of first RDO variable tree 310, account 312, and account first name 314 through variable tree usage 340, account usage 342, and account first name usage 344, respectively. This requires that for the rule corresponding to variable tree 330, at least v0 is implemented by a decision service. However, v1 would also be compatible as second RDO variable tree 320 is shown as including the variables for v0. Thus, on deployment of the rule in a rule package, v0 or v1 are compatible versions of the RDO specification. Using these compatible versions, a hardened rule package of the corresponding rule may be generated by packaging information for the compatible versions with the rules and rule package.

Figure 4:
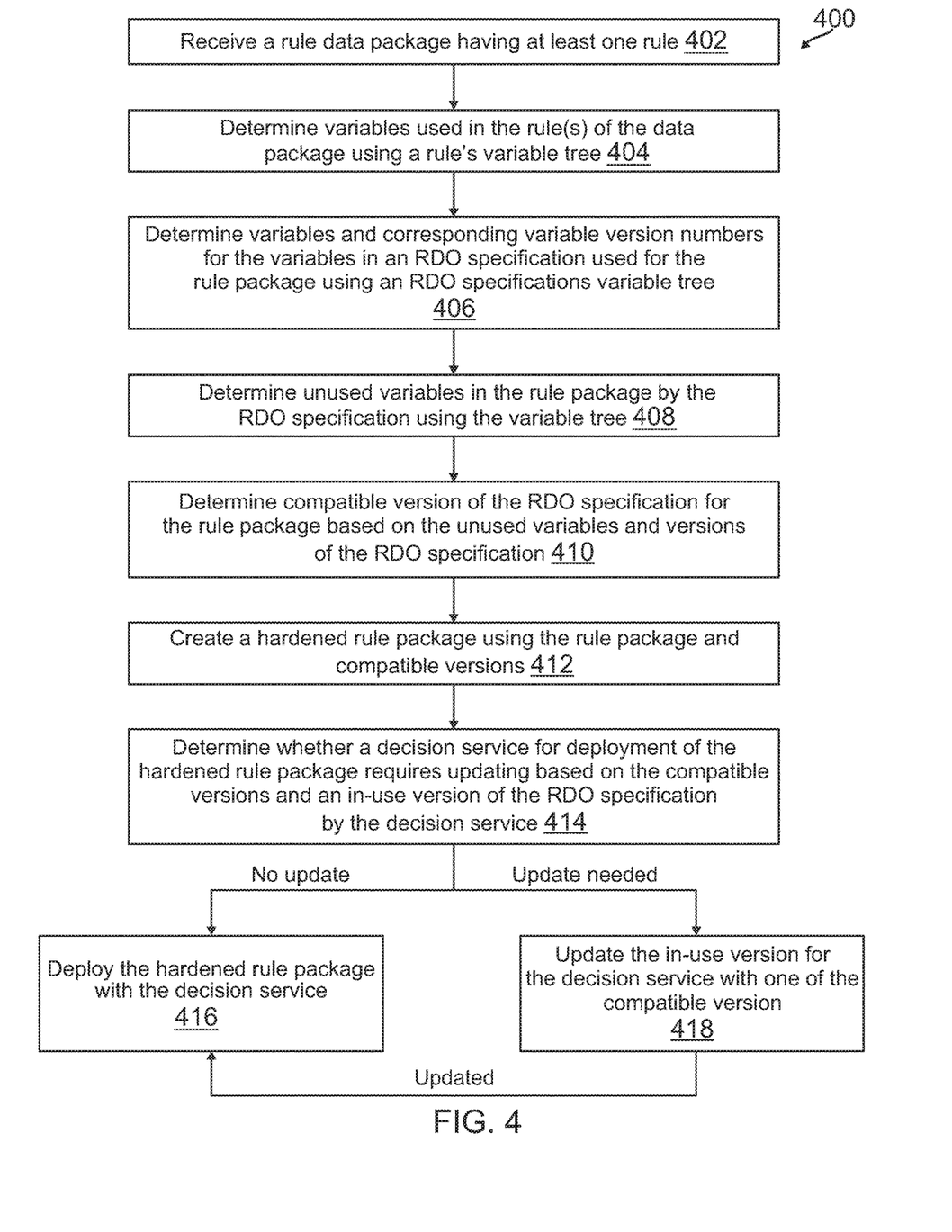
FIG. 4 is a flowchart of an exemplary process for hardening of rule data object version for smart deployment, according to an embodiment.

FIG. 4 is a flowchart 400 of an exemplary process for hardening of rule data object version for smart deployment, according to an embodiment. Note that one or more steps, processes, and methods described herein of flowchart 400 may be omitted, performed in a different sequence, or combined as desired or appropriate.

At step 402 of flowchart 400, a rule package having at least one rule is received. The rule package may correspond to the rule(s) written using an RDO specification, where the RDO specification includes variables for data objects that may load data to the rule for execution of the rule, data processing, and decision-making in a decision service (e.g., for fraud, compliance, risk analysis, authentication, electronic transaction processing, and the like). At step 404, variables using in the rule(s) of the data package are determined using a rule's variable tree. The variable tree for a rule may correspond to a mapping, in a decision tree-like structure or other similar comparison structure, that shows each used variable and data structure within the rule, such as the variable used to load some piece of data to the rule. This allows for visualization of the rule and breakdown of the used variables.

At step 406, variables and corresponding variable version numbers for the variables in an RDO specification used for the rule package are determined using an RDO specification's variable tree. For example, an RDO specification's variable tree may include branches for the corresponding versions of the RDO specification, with each version's branches showing the corresponding variables and data objects released and utilized by that version of the RDO specification. Moreover, later released (e.g., higher or more recent) versions of RDO specification may also include the previous version's variable tree, as well as the delta or change of variables (e.g., newly added variables) in the later released versions. Determination of the variables in an RDO specification using the RDO specification's variable tree may include accessing a precomputed and determined RDO specification's variable tree, or instead may be performed when analyzing and hardening the rule data package.

Thereafter once the variable trees have been accessed and/or determined, the unused variables in the rule package by the RDO specification are determined using the variable trees, at step 408. For example, the variable trees may be compared to identify which variables are used by the rule(s) in the rule package, for example, by identifying the versions and corresponding branches of the RDO specification's variable tree used by the rule's variable tree. Further, the unused variables are determined and removed from the rule package so that only those variables used by rules within the rule package remain. Using this, at step 410, compatible versions of the RDO specification for the rule package are determined based on the unused variables and the versions of the RDO specification. The compatible versions may be determined and identified from the compared variable trees by determining an oldest or minimum required version of the RDO specification used by the rule(s) in the rule package. Thus, the rule package may be compatible with the minimum version and more recent versions that include all the variables used by the rule. Once the compatible versions are determined, a hardened rule package is created using the rule package and the compatible versions, at step 412. This may include packaging the compatible versions with the rule package. Further, the hardened rule package may be provided to a rule release application and/or repository for deployment and/or storage.

At step 414, it is determined whether a decision service for deployment of the hardened rule package requires updating based on the compatible versions and an in-use version of the RDO specification by the decision service. For example, a request for deployment of the hardened rule package may be received by a smart deployer, which may identify a decision service for deployment of the hardened rule package. In this regard, the smart deployer may determine a version currently in-use by the decision service for reading and executing rules in rule packages implemented by the decision service. Thereafter, the smart deployer may compare this in-use version to the compatible version(s) of the hardened rule package required for rule reading and executing. The smart deployer then determines whether an update to the decision service is required.

If no update is required, at step 416, the hardened rule package is deployed to the decision service without updating of the decision service. This allows for the hardened rule package to be used in the decision service for automated decision-making based on the corresponding rules, which may be read and executed using the in-use version of the RDO specification. However, if the decision service is running an older and/or incompatible version of the RDO specification, and therefore unable to read and execute the hardened rule package (e.g., by lacking a version of the RDO specification having all of the variables required by the rule), at step 418, the smart deployer performs an update of the in-use version for the decision service with one of the compatible versions. This may correspond to a latest version, or at least a more recent version that is compatible with the hardened rule package. Updating may be performed as a hot automated update to the decision service's version of the RDO specification, which may be performed without user input and/or requests. Once updated, flowchart 400 may return to step 416 where the hardened rule package is deployed with the decision service, for example, for automated decision-making by reading and executing the rule(s) of the rule package using the updated version of the RDO specification.

Figure 5:
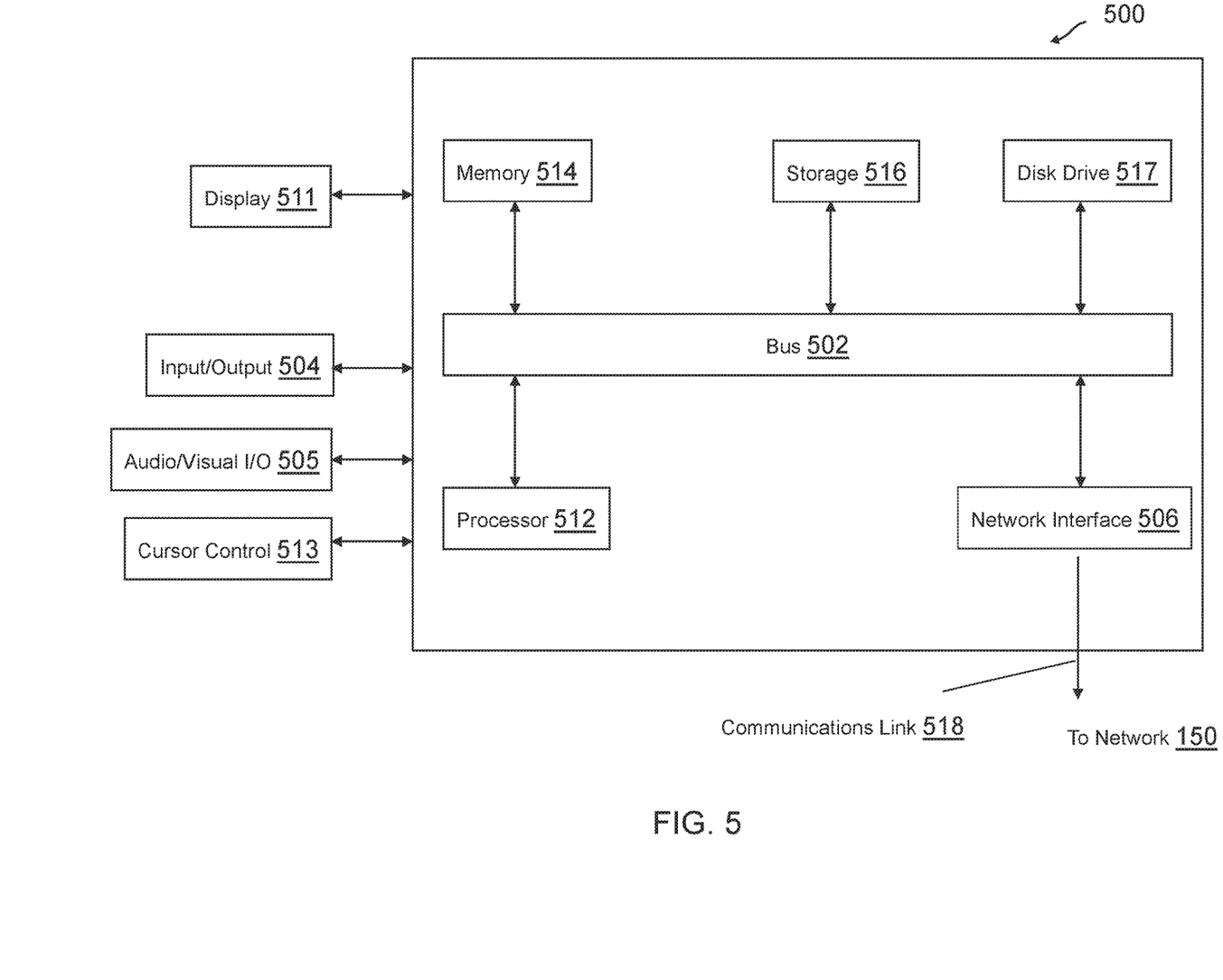
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving a data package comprising a first rule having one or more first variables from a rule data object (RDO) specification, wherein a first version of the RDO specification comprises a plurality of variables that is utilized by a rule authoring application for a generation of the first rule;
determining the one or more first variables used by the data package based on at least the first rule;
determining one or more second variables comprising one or more unused ones of the plurality of variables from the first version of the RDO specification based on the one or more first variables and the first version;
determining, from a plurality of versions including the first version of the RDO specification, at least one compatible version of the RDO specification for the data package based on the one or more first variables and the one or more second variables;
determining a second version of the RDO specification used by a first rule decision service;
determining whether to update the second version of the RDO specification used by the first rule decision service based on the at least one compatible version for the data package; and
deploying the data package to the first rule decision service based on the determining whether to update the second version used by the first rule decision service.

2. The system of claim 1, wherein the operations further comprise:
receiving a request to deploy the data package with the first rule decision service, wherein the data package is deployed to the first rule decision service in response to receiving the request to deploy the data package.

3. The system of claim 1, wherein the operations further comprise:
in response to determining to update the second version of the RDO specification used by the first rule decision service, updating the second version of the RDO specification to one of the at least one compatible version of the RDO specification, wherein the deploying the data package to the first rule decision service is further based on the updating.

4. The system of claim 3, wherein the updating is performed using an automated deployment of the one of the at least one compatible version of the RDO specification to the first rule decision service without requiring a user input requesting the updating.

5. The system of claim 1, wherein the operations further comprise:
determining not to update the second version of the RDO specification used by the first rule decision service based on the second version being a same or higher version than the at least one compatible version.

6. The system of claim 1, wherein the operations further comprise:
determining a third version of the RDO specification used by a second rule decision service; and
determining whether to update the third version of the RDO specification used by the second rule decision service based on the at least one compatible version for the data package.

7. The system of claim 1, wherein the determining the one or more second variables comprises:
determining a variable usage tree for the first rule;
determining a variable version number tree for the plurality of variables in the first version of the RDO specification; and
comparing the variable usage tree to the variable version number tree, wherein the determining the one or more second variables is based on the comparing.

8. The system of claim 7, wherein each variable of the plurality of variables in the variable version number tree is associated with a corresponding version number associated with the RDO specification that indicates when the variable was added to the RDO specification.

9. The system of claim 8, wherein each branch in the variable version number tree corresponds to one of the plurality of variables having at least one corresponding data object, and wherein the at least one corresponding data object is further associated with the corresponding version number.

10. The system of claim 1, wherein the data package further comprises a second rule having one or more third variables from the RDO specification, and wherein the determining the one or more second variables are further based on the one or more third variables of the second rule.

11. The system of claim 1, wherein each variable in the one or more first variables is associated with a corresponding data object for loading of data associated with the variable to perform at least a portion of data processing for the system.

12. A method comprising:
accessing, by one or more hardware processors, a rule package comprising at least one rule including a plurality of data object variables corresponding to a rule data object (RDO) specification, wherein the plurality of data object variables is associated with data objects that load data associated with the at least one rule for performing at least one decision-making operation, and wherein the rule package is designated for deployment to a decision service for the performing the at least one decision-making operation;
determining at least one version of the RDO specification that is compatible with the rule package based on the plurality of data object variables and a plurality of versions available for the RDO specification;
determining, from the plurality of versions available for the RDO specification, a first version that is utilized by the decision service for the RDO specification; and
determining whether to update the first version of the RDO specification for the decision service based on the at least one version of the RDO specification that is compatible with the rule package; and
deploying, by the one or more hardware processors, the rule package to the decision service based on the determining whether to update the first version of the RDO specification for the decision service.

13. The method of claim 12, further comprising:
in response to determining to update the first version of the RDO specification for the decision service, updating the first version of the RDO specification to a second version corresponding to the at least one version for the decision service, wherein the rule package is deployed to the decision service after the updating.

14. The method of claim 13, wherein the second version comprises a highest version number from the at least one version that is compatible with the rule package.

15. The method of claim 12, further comprising:
determining not to update the first version of the RDO specification for the decision service when the first version is equal to or higher than the at least one version.

16. The method of claim 12, further comprising prior to the determining the at least one version of the RDO specification that is compatible with the rule package:
accessing the plurality of data object variables of the at least one rule from the rule package; and
determining one or more unused variables from a third version of the plurality of versions of the RDO specification based at least in part on the plurality of data object variables, wherein the determining the first version is further based on the one or more unused variables.

17. The method of claim 16, wherein the third version of the RDO specification is utilized by a rule authoring application for writing the at least one rule for the rule package, and wherein the accessing the rule package is by a rule release application from the rule authoring application.

18. The method of claim 16, wherein the first version comprises a highest version of the plurality of versions required by the decision service for an execution of the rule package during the at least one decision-making operation.

19. A non-transitory machine-readable medium having stored thereon machine-readable instructions executable to cause a machine to perform operations comprising:
   accessing, from a rule release application, a hardened rule package comprising a data processing rule including a first plurality of variables, wherein the hardened rule package is designated for deployment to a decision service;
   determining that a particular version of a rule data object (RDO) specification is required to perform a computer operation associated with the data processing rule by the decision service based on the first plurality of variables;
   determining a first version of the RDO specification used by the decision service;
   determining whether to update the first version of the RDO specification for the decision service based on a comparison between the particular version and the first version; and
   deploying the hardened rule package to the decision service based on the determining whether to update the first version of the RDO specification used by the decision service.

20. The non-transitory machine-readable medium of claim 19, wherein the operations further comprise, prior to receiving the hardened rule package:
   determining a second version of the RDO specification used to generate the data processing rule, wherein the second version of the RDO specification comprises a second plurality of variables; and
   determining one or more unused ones of the second plurality of variables based on a comparison between the first plurality of variables of the data processing rule and the second plurality of variables, wherein the determining the particular version of the RDO specification is further based on the one or more unused ones of the second plurality of variables.

* * * * *

UNITED STATES PATENT AND TRADEMARK OFFICE
CERTIFICATE OF CORRECTION

PATENT NO. : 11,354,111 B2
APPLICATION NO. : 17/009562
DATED : June 7, 2022
INVENTOR(S) : Sumit Kumar et al.

It is certified that error appears in the above-identified patent and that said Letters Patent is hereby corrected as shown below:

In the Claims

Claim 12, Column 20, Lines 36-37, change "the decision service for the RDO specification; and determining whether to update the first version of the" to --the decision service; determining whether to update the first version of the--.

Signed and Sealed this
Ninth Day of May, 2023

Katherine Kelly Vidal
*Director of the United States Patent and Trademark Office*